Dec. 9, 1952 M. MENNESSON 2,620,653
INSTRUMENT FOR MEASURING DIAMETERS
Filed May 13, 1949

INVENTOR
MARCEL MENNESSON
BY Bailey, Stephens & Huettig
ATTORNEYS

Patented Dec. 9, 1952

2,620,653

UNITED STATES PATENT OFFICE 2,620,653

INSTRUMENT FOR MEASURING DIAMETERS

Marcel Mennesson, Neuilly-sur-Seine, France, assignor to "Societe d'Applications et de Constructions pour Materiel Automobile (S. A. C. M. A.)", S. A. R. L., Neuilly-sur-Seine, France, a society of France Application May 13, 1949, Serial No. 93,173
In France June 8, 1948

5 Claims. (Cl. 73—37.5)

The present invention relates to instruments for measuring inner diameters, especially in the case of pieces having a cylindrical bore which contains a circular core.

Measurement of the inner diameters of hollow or tubular pieces and of holes or bores can be commonly performed by means of known instruments, for instance in the case of pneumatic measurements through "plugs" provided with at least two opposite nozzles, such as described in the French Patent No. 722,685 filed in the name of the Societe d'Applications et de Constructions pour Materiel Automobile. However, many problems concerning the measurement of inner diameters cannot be solved by means of these instruments.

The object of the present invention is to provide a measurement instrument of the kind in question which can be used in the case of pieces as above described.

According to my invention, this instrument includes a body of approximately the form of an annular cylinder sector of a radial thickness smaller than that of the hollow space between the inner wall of said bore and said core, the outer face of said body being shaped to contact said wall in at least three points located along two distinct generatrices thereof, means carried by said body on said outer face thereof at a point at least substantially halfway between said two generatrices being provided to measure the distance between said point and said wall, and push-pieces elastically carried by said body and projecting from the other face thereof in engagement with said core urging said body toward said wall.

Figure 1:
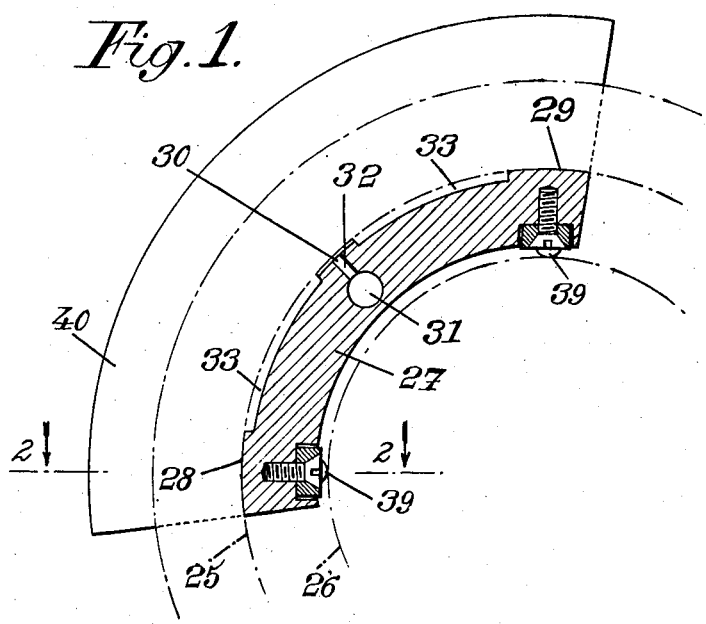
Figure 2:
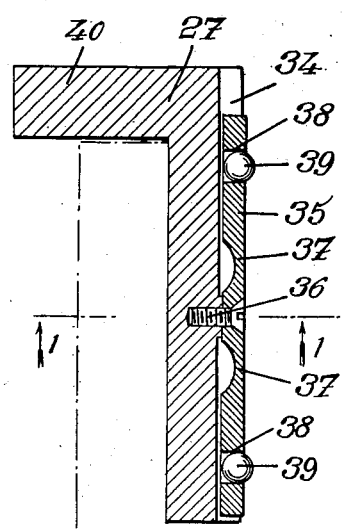

A preferred embodiment of the present invention will be hereinafter described with reference to the accompanying drawings, given merely by way of example and in which:

Figs. 1 and 2 show, in cross section on the line 1—1 of Fig. 2 and in longitudinal section on the line 2—2 of Fig. 1 respectively, a measurement instrument made according to the invention.

In the following description, it will be supposed, merely by way of example, that the measurement instrument is of the pneumatic kind, although the invention can be applied to other kinds of measurement instruments.

The instrument shown by Figs. 1 and 2 is intended for the measurement of the outer diameter of an annular space limited by cylindrical faces 25 and 26. The body 27 of the instrument is given the shape of a portion of a cylinder. This body 27 is applied against the face or wall 25 of the piece to be measured along two generatrices or cylindrical portions 28 and 29 by means of push-pieces to be hereinafter referred to. Fluid under pressure is supplied to the nozzle 30 of the measurement apparatus through a conduit 31 and a calibrated orifice 32. This nozzle 30 is located slightly on the inside of the generatrices or cylindrical portions 28 and 29 in order to protect it. Recessed portions 33 permit exhaust of the fluid used for the measurements.

Fig. 2 shows in what manner the above mentioned push-pieces are advantageously made. I provide in the body 27 of the instrument a longitudinal groove 34 in which an elastic rod 35 is fixed, for instance by means of a central screw 36. This rod 35 includes two portions 37 which are thinned off, these portions being located close to this central portion so that the ends of the rod can bend more easily. Said ends are made of a thickness smaller than that of the central portion so that they can move slightly. In these respective ends are provided holes 38 which form housings for balls 39 which can be engaged with a force fit into their respective housings in such manner that a portion of each ball projects from the outer face of rod 37. These balls 39 come to bear, under the effect of the natural elasticity of rod 37, upon wall 26, which belongs to the piece to be measured or to an auxiliary piece so as to apply the generatrices or cylindrical portions 28 and 29 tightly against the wall 25 of the piece to be measured.

In the case of a narrow annular space, the instrument may be provided with a stiffening flange 40 running along one of its transverse edges.

The example shown by Figs. 1 and 2 is adapted to the measurement of the external face or wall 25 of the annular space. An analogous, but reversely arranged device might be used for measuring the inner face 26 of this space.

The method of utilization of these various instrument is as follows:

The instrument is kept in position by push-pieces 39 which bear elastically upon surface 26 in the case illustrated, the dimensions and state of which surface have no influence upon the measurement. According to the value of the diameter of the cylindrical wall 25, nozzle 30 is more or less remote from said wall and the pneumatic measurement instrument indicates the value of the distance between the outlet of this nozzle and said wall, whereby the diameter of wall 25 can be known.

In a general manner, while I have, in the above description, disclosed what I deem to be practical and efficient embodiments of my invention, it should be well understood that I do not wish to be limited thereto as there might be changes made in the arrangement, disposition and form of the parts without departing from the principle of the present invention as comprehended within the scope of the accompanying claims.

What I claim is:

1. An instrument for measuring the diameter of the wall of a cylindrical bore containing a circular core, which comprises in combination a body of at least approximately the form of an annular cylinder sector of a radial thickness smaller than that of the hollow space between said wall and said core, the outer face of said body being shaped to contact said wall in at least three points located along two distinct generatrices thereof, means carried by said body on said outer face thereof at a point at least substantially halfway between said two generatrices to measure the distance between such point and the bore wall, and push pieces elastically carried by said body and projecting from the other face thereof for engagement with said core to urge said body and said diameter measuring means toward said wall.

2. An instrument for measuring the diameter of the wall of a cylindrical bore containing a circular core, which comprises in combination a body of at least approximately the form of an annular cylinder sector of a radial thickness smaller than that of the hollow space between said wall and said core, the outer face of said body being shaped to contact said wall along two distinct generatrices thereof, means carried by said body on said outer face thereof at a point at least substantially halfway between said two generatrices to measure the distance between such point and the bore wall, and push pieces elastically carried by said body and projecting from the other face thereof for engagement with said core to urge said body and said diameter measuring means toward said wall.

3. A measurement instrument according to claim 2, in which said body is provided with grooves in the second mentioned face thereof, parallel to the generatrices of contact of the other face, each push piece including an elastic rod housed in one of said grooves, means for fixing the middle part of said rod to said body, the portions of the rod close to said middle part being thinner and the ends of the rod being slightly away from the bottom of the groove so that the rod can bend about said middle part.

4. A measurement instrument according to claim 2, in which said body is provided with grooves in the second mentioned face thereof, parallel to the generatrices of contact of the other face, each push piece including an elastic rod housed in one of said grooves, means for fixing the middle part of said rod to said body, the portions of the rod close to said middle part being thinner and the ends of the rod being slightly away from the bottom of the groove so that the rod can bend about said middle part, the free ends of said rod being provided with holes forming housings, and balls engaged with a force fit in said housings, respectively, and projecting slightly from the edges thereof.

5. An instrument according to claim 2, said body including a stiffening flange running along one of its circular edges.

MARCEL MENNESSON.

REFERENCES CITED

The following references are of record in the file of this patent:

UNITED STATES PATENTS

| Number | Name | Date |
|---|---|---|
| 1,308,324 | Bellard | July 1, 1919 |
| 1,845,359 | Stein | Feb. 16, 1932 |
| 2,026,187 | Mennesson | Dec. 31, 1935 |
| 2,139,282 | Poock et al. | Dec. 6, 1938 |
| 2,370,219 | Aller | Feb. 27, 1945 |
| 2,479,606 | Douglass | Aug. 23, 1949 |
| 2,574,342 | Mennesson | Nov. 6, 1951 |